United States Patent
Cornelius et al.

[15] 3,665,049
[45] May 23, 1972

[54] DEHYDROGENATING PROPANE OVER CHROMIA-ALUMINA CATALYST

[72] Inventors: Edward B. Cornelius, Swarthmore, Pa.; David W. Koester, Wilmington, Del.

[73] Assignee: Air Products and Chemicals, Inc., Philadelphia, Pa.

[22] Filed: May 28, 1970

[21] Appl. No.: 41,549

[52] U.S. Cl. ................................260/683.3, 252/465
[51] Int. Cl. .........................................C07c 5/18
[58] Field of Search ..............760/683.3; 252/465

[56] References Cited

UNITED STATES PATENTS 3,419,352  12/1968  Acciarri ..................................23/143
3,267,025  8/1966   Gring et al. ........................260/683.3

Primary Examiner—Delbert E. Gantz
Assistant Examiner—Veronica O'Keefe
Attorney—J. R. Ewbank and B. Max Klevit

[57] ABSTRACT

Triethyl aluminum is employed as reactant in a conversion to valuable products, forming an alumina by-product consisting predominantly of alumina alpha-monohydrate and a significant amount of amorphous alumina. Particles of this by-product are marketed as a technical grade of boehmite. A precursor mixture is prepared comprising calcined alumina powder, a larger amount of said technical grade of boehmite, and an aqueous solution containing ammonium dichromate. Said mixture is extruded, sliced into pellets, calcined in steam, and cooled to provide dehydrogenation catalyst consisting of about 20 percent chromia and 80 percent alumina. Propane at subatmospheric pressure is dehydrogenated at a high conversion per pass to provide an attractive yield of propene over said catalyst at 570°–680° C. at a space velocity of from about 0.2 to about 5 volumes of liquid propane per volume of catalyst per hour during a commercially acceptable catalyst life.

4 Claims, No Drawings

DEHYDROGENATING PROPANE OVER CHROMIA-ALUMINA CATALYST

GENERAL BACKGROUND

Chromia-alumina catalysts have been prepared by a variety of procedures, including impregnation of alumina particles, cogelation of alumina and chromia gels, and extrusion of compositions calcinable to provide sorptive chromia-alumina. In quickly burning out the coke deposited during use of chromia-alumina catalyst, the temperature of a zone of a catalyst bed is raised sufficiently that there is danger of loss of surface area of the catalyst particles. In a fixed bed of granular particles of chromia-alumina catalyst, there is a tendency for the formation of hot spots, in which the increased deposition of coke is autocatalytic over a plurality of cycles. Accordingly, uniformity of performance of particles throughout a bed of chromia-alumina catalyst is of significant importance. It is important that a chromia-alumina catalyst particle have significant crushing strength, attrition resistance, surface area and other desirable physical properties. Because of the difficulty of achieving the necessary commercial characteristics for a chromia-alumina catalyst by any other procedure, a significant portion of the chromia-alumina catalysts heretofore marketed for butane dehydrogenation have been made by procedures requiring preparation of alumina particles and the subsequent impregnation of the chromia into such alumina particles. It has generally been profitable to replace the catalyst inventory from two to 20 times per decade to compensate for catalyst deactivation, and the catalyst life has been one of the significant factors affecting selection amongst competitive catalysts. The uses of chromia-alumina in reforming, dealkylation, and related commercial methods have generally involved catalyst life problems which were less severe than the catalyst life problems for butane dehydrogenation. Although there have been proposals for dehydrogenation of propane using catalysts employed commercially for butane dehydrogenation, the results have been unsatisfactory. At conditions preserving the surface area, activity, and stability of the catalyst for weeks of operation, propane dehydrogenation has involved objectionably low conversion and objectionably high recycle ratios. At conditions providing attractive conversion to propene and low recycle ratios, the chromia-alumina catalysts employed industrially for butane dehydrogenation have deteriorated rapidly, losing surface area, activity, and stability within a small fraction of an acceptable catalyst life. The cumulative weight of product per kilogram of replaced catalyst is very great when catalyst replacement periods are several years, but is very small when catalyst replacement periods are a few weeks. Although there have been several proposals for propane dehydrogenation, substantially all propene used industrially has been recovered from other operations, such as gas oil cracking, instead of by dehydrogenation of propane.

SUMMARY OF THE PRESENT INVENTION

In accordance with the present invention, propene is prepared by dehydrogenation of propane over a bed of chromia-alumina catalyst at high severity over a period of many months, whereby a batch of catalyst may have a commercially satisfactory life at the high severity operation. The invention features a method of making the chromia-alumina catalyst as well as the catalytic product of such method. A novel precursor composition for making chromia-alumina catalyst particles features a technical grade of boehmite as the principal aluminaceous component, modified by a lesser amount of calcined alumina so that the technical boehmite provides from 1.01 to 1.5 as much $Al_2O_3$ in the final catalyst as the calcined alumina. One variety of calcined alumina results from dehydrating technical boehmite for at least 15 minutes at a temperature from about 400° to about 500° C. (752°–932° F., e.g., 900° F.). This provides dehydrated alumina having less than 3 percent ignition loss and hence is designated as a mildly calcined alumina. An aqueous solution of chromium compounds, including ammonium dichromate is included in the precursor which contains no other component providing more than about 1 percent of the final catalyst. A compound providing in the final catalyst a trace of a metal oxide such as $K_2O$ or $Na_2O$ may be included in the precursor if desired. Such metal oxides are intended to enhance the selectivity of the catalyst and hence are designated as selectivity enhancers. Said precursor is converted into chromia-alumina catalyst particles by steps comprising particle formation, drying, calcining, and cooling the catalyst particles sufficiently to permit shipment thereof to a dehydrogenation unit.

DESCRIPTION OF ILLUSTRATIVE EMBODIMENTS

The nature of the invention is further clarified by reference to a plurality of examples.

EXAMPLE I

Triethyl aluminum is employed at conditions providing a hydrated alumina by-product which is marketed as a technical grade of boehmite. The ultimate crystallite size of the boehmite is under 100 angstroms. The ignition loss is about 25 percent.

A rotary calciner was employed to mildly calcine technical boehmite at about 900° F. for about 20 minutes to provide a sorptive alumina having a surface area of approximately 160 $m^2/g$. The mildly calcined alumina was ground in a hammermill using a screen having 0.027 inch openings to provide a powder. To 1,220g of such powder was added 2,290g of a similarly ground powder of technical boehmite (not calcined) and the two were dry blended before transfer to a mulling system.

A solution was prepared consisting of about 1,385 ml of water, about 1030g of ammonium dichromate, and about 48g of sodium chromate, and the solution (1800 ml) was heated to about 70° C. Small portions of the hot solution were added to the mixed powders while mulling the mixture. About 230 ml of a solution of 194g $CrO_3$ in 135g of water was added to increase the $Cr_2O_3$ content of the catalyst above the amount readily achieved from an aqueous solution of ammonium dichromate. The extrudability characteristics of the mixture were enhanced by addition of 150 ml of water near the final stages of the approximately 1 hour of mulling. Prior to such addition, the water content is about 1,520 ml, and the final adjustment requires from about 5 to about 15 percent additional water depending upon previous evaporation losses, particle size of the alumina, temperature of the muller, and related variables, so that a range from about 75 to about 225 ml of supplemental water would be described in an operating manual instead of the specific 150 ml found suitable in this batch. The pH of the mulled composition was 3.8. The unit mol ratio of $Al_2O_3$ to $Cr_2O_3$ was 5.5, corresponding to about 21 percent by weight $Cr_2O_3$ in the contemplated $Al_2O_3$-$Cr_2O_3$ catalyst.

The mulled mixture was transferred to an extruder having a barrel of about 5 cm diameter, and extruded into cylindrical strands having about 1.6 mm diameter. A torque gauge on the extruder registered about 130. A wire blade sliced the strands into pellets having a length from about 2 to about 6 mm. The pellets were dried for 2 hours in an oven in which warm air at about 120° C. was circulated. The dried particles were screened to remove aggregates and dust, and to retain the 8–14 mesh size pellets.

The dry pellets were heated to about 310° C. in dry air, and in 20 percent steam to 760° C., and calcined for 4 hours in 20 percent steam at about 760° C., the flow rate of the steam air mixture being about 120 volumes of gas per volume of pellet bed per hour. The pellets were cooled, packaged in drums sealed from atmospheric moisture, and warehoused.

Some of the characteristics of the pellets were:

| | |
|---|---|
| bulk density | 820g/liter |
| crushing strength kg | 3.85 |
| surface area $m^2/g$ | 91 |

The pellets were evaluated for initial activity for preparing propene from propane in a 30 cc isothermal reactor at 240 mm pressure and a space rate (volume of liquid propane per volume of catalyst bed per hour) of 1, noting the following results:

| | ° C. Bed Temperature | | |
|---|---|---|---|
| | 564 | 596 | 623 |
| Yields, wt. % | | | |
| $C_1$ and $C_2$ | 2.7 | 6.6 | 11.5 |
| propene | 47.8 | 57.8 | 57.0 |
| propane disappearance or wt. % conversion | 53.9 | 71.3 | 80.0 |
| propene selectivity | 88.6 | 81.3 | 71.3 |

Such data suggested that the pellets had effectiveness in preparing propene by the dehydrogenation of propane.

EXAMPLE II

Triethyl aluminum was employed in a manufacturing operation in which gelatinous alumina was a by-product. The aqueous suspension of alumina was processed so that boehmite was a predominant crystalline form. The suspension was spray dried to provide a particle size distribution suitable for tableting. The spray dried alumina had a small amount of volatile organic alcohol and a total ignition loss of 25 percent. The carbon content of the spray dried alumina was less than 1 percent. In standard evaluation procedures comprising the heating of the alumina for 3 hours at 900° F., the technical grade of boehmite was converted to a gamma alumina having an ultimate crystallite size of about 50 angstroms. The surface area of such gamma alumina was approximately 250 sq. meters per gram. When the spray dried alumina was mixed with water, it tended to form gummy mixtures which were not suitable for extrusion or related processing steps. In order to overcome the troublesome gumminess, the catalyst precursor was prepared by modifying 3,430g of the spray dried alumina with 1,600g of alpha alumina powder.

Particular attention is called to the intentional incorporation of alpha alumina powder in the catalyst precursor. Prior literature has generally treated alpha alumina as an undesirable component in a chromia-alumina catalyst. The alpha alumina formed during deactivation of chromia-alumina catalyst has apparently catalyzed further deactivation of prior catalysts. The use of independent particles of alpha alumina, mechanically admixed with the chromia-alumina catalyst particles, as a heat sink for increasing the heat capacity of an adiabatic bed has been standard practice for several decades. There has been a long standing demand for eliminating the labor expense of particle mixing and separation of the two kinds of particles. The incorporation of alpha alumina powder in the catalyst precursor particles contributes high heat capacity and high density to the final catalyst without jeopardizing its commercially attractive utility and stability.

The two dry powders, that is 3,430g of spray dried technical grade of boehmite and 1,500 grams of alpha alumina were dry blended and then transferred to a pan of a Lancaster muller. In another vessel, 1,670 grams of ammonium dichromate, containing approximately 1,000 grams of chromia were dissolved in hot water, providing 1,800 milliliters of the solution. The solution was added periodically during the mulling of the mixture. The final adjustment of the viscosity and extrudability characteristics of the composition was made by addition of a small amount of supplemental water.

The composition was transferred to an extruder having openings for the preparation of cylindrical strands having a diameter of about 3.1 millimeters. The extruded strands were cut into cylindrical pellets having a length from about 3 to about 6 millimeters. The torque gauge on the extruder registered about 140.

The pellets were dried and screened and transferred to the calcining apparatus. The pellets were heated to 600° F. in dry air, then to 1,400° F. in a mixture of 20 percent steam in air. After the catalyst had been calcined for 4 hours at 1,400° F., the pellets were cooled to about 200° F., and then packaged in sealed drums for warehousing.

Among the physical properties of the thus prepared catalysts are the following:

| Characteristic | Property |
|---|---|
| Bulk density | 1.01 Kg/l |
| Crushing strength | 6.9 kilograms |
| Surface area | 69 sq. meters/g. |
| Pellet diameter | 3.1 mm |

The catalyst was employed for the dehydrogenation of propane to propene with the following results.

| | ° C. Bed Temperature | | |
|---|---|---|---|
| | 565 | 593 | 626 |
| Yields, wt.% | | | |
| $C_1$ and $C_2$ | 1.8 | 3.6 | 7.4 |
| Propene | 45.0 | 55.7 | 60.3 |
| Propane disappearance or wt.% conversion | 49.3 | 63.3 | 74.5 |
| Propene selectivity | 91.3 | 88.0 | 80.9 |

No data relating to the long term usefulness of such catalyst pellets were obtained, but the initial activity data suggest that the catalyst pellets were effective in preparing propene by the dehydrogenation of propane.

EXAMPLE III

Chemicals are prepared using triethyl aluminum and the alumina formed as a by-product is recovered and subjected to spray drying to provide a powder comprising a major amount of boehmite (alumina alpha monohydrate) and a minor amount of amorphous alumina. The carbon content is less than 1 percent, notwithstanding its derivation from triethyl aluminum. Of particular importance, the concentration of impurities such as silicon, iron, sodium, boron, magnesium and the like is remarkably low, the total of such impurities being less than about 0.1 percent. Such spray dried boehmite is marketed as a powder for use by any manufacturer desiring boehmite of exceptionally high purity. In a control test, a mixture consisting of the spray dried alumina and water was a gummy composition which could not be extruded.

Mildly calcined alumina is prepared by heating one portion of said spray dried alumina at a temperature above about 400° C. and below about 480° C. at conditions preserving the powdery characteristic. An alumina blend is defined as a mixture utilizing said mildly calcined (400°–480° C.) alumina and more spray dried alumina, the amount of spray dried alumina constituting from about 1.01 to about 1.5 times as much anhydrous alumina as the mildly calcined alumina. Thus the mildly calcined alumina is from about 33 to about 43 percent of the blend of aluminas. A precursor composition is prepared consisting of said alumina blend, ammonium dichromate, and chromic acid, the proportions of precursor components being adapted to provide an alumina to chromia weight ratio in the finely calcined catalyst of approximately 4 to 1, said precursor containing water, and said precursor containing no other component providing more than about 1 percent of the final catalyst. If desired, a small amount of sodium chromate may be employed in the precursor so that the sodium oxide content of the calcined catalyst is within a range from about 0.1 to about 0.8 percent, desirably 0.4 percent.

The precursor composition is thoroughly mixed and transferred to an extruder, in which the precursor is extruded into cylindrical strands. Cylindrical pellets having a length to diameter ratio within a range from about 1 to about 5 result from cutting the strands. The thus prepared pellets are calcined at a temperature above 480° C. and below 810° C. to provide the superior chromia-alumina catalyst particles of the present invention. The particles are cooled and transferred to a catalyst chamber and heated to a temperature suitable for the dehydrogenation zone. The catalyst bed in the dehydrogenation zone is heated and maintained at a temperature within the range from about 570° to about 680° C. during the dehydrogenation portion of the operating cycle. Propane is directed through the catalyst bed at a space rate of from about 0.2 to about 5 volumes of liquid propane per volume of catalyst per hour. Although the conditions for the propane dehydrogenation are severe, the stability of the catalyst during many months of use establishes its stability as outstanding, permitting high yields of propene with good selectivity at high conversion levels during many months of operation.

EXAMPLE IV

A catalyst was prepared following the general procedure of Example III and utilizing an alumina blend in which 40 percent of the anhydrous alumina (eventual calcined basis) was derived from the mildly calcined and 60 percent of the technical grade of alumina having boehmite as its principal constituent. About 80 percent of the chromium compound in the aqueous solution was ammonium dichromate, and about 20 percent was chromic acid. After the particles had been calcined at 790° C., they were given a treatment intended to bring about deterioration of the catalyst approximately equivalent to a year of normal operation of a dehydrogenation unit. The accelerated aging treatment required 72 hours of cycling in a stream of hydrogen and then alternately in a stream of air at 820° C.

Laboratory apparatus for investigating isothermal dehydrogenation included a catalyst bed having a volume of about 30 ml. Propane was passed over the bed of chromia catalyst at a pressure of 240 mm at a space rate of 1 liquid volume of propane per hour per volume of catalyst while maintaining the catalyst bed at about 590° C. The results were compared with the preparation of propene on the same apparatus at the same conditions using a commercially marketed chromia-alumina catalyst having about 20 percent chromia and about 80 percent alumina. Both catalyst samples before testing were artificially aged at similar conditions. Data relating to the tests were noted as follows.

| Catalyst Description | Propane Disappearance Wt.% | Propene Selectivity Wt.% | Propene Yield Wt.% | Coke Wt.% |
| --- | --- | --- | --- | --- |
| Control | 50 | 78 | 40 | 4.0 |
| Example IV | 54 | 87 | 47 | 1.7 |

Said data show that the catalyst of Example IV provides better selectivity than for the control catalyst. Moreover, the low coke yield permits more precise control of the process with less danger of evolution of hot spots.

EXAMPLE V

A chromia-alumina catalyst was prepared following the general procedure of Example IV but utilizing pellets having a length and diameter of about one-eighth inch instead of one-sixteenth inch. By reason of the large pore distribution in the catalyst particles, the diffusion problems were not excessive in the larger particles. Propene production over the small pellets at conditions closely resembling those of the catalyst of Example II provided only slightly superior results.

EXAMPLE VI

A series of catalysts are prepared following the general procedure of Example IV, but incorporating a minor amount of a compound of a precursor for a metal oxide intended to enhance the selectivity of the catalyst. The selectivity enhancing agent may be an oxide of an alkali metal such as potassium, sodium, or other suitable metal. Such selectivity enhancing agents in a concentration of from about 0.01 to 0.9 percent in the final catalyst tend to permit retention of surface area after accelerated aging treatment, but are only very slightly effective in increasing stability for propene production at very severe conditions. Thus selectivity enhancing agents are shown to be much less significant in propene production than in the manufacture of isobutene or normal butene. An upper limit of about 0.8 percent is established for the concentration of the selectivity enhancing agent in the chromia-alumina catalyst for propene production.

The invention claimed is:

1. The process of preparing propene which includes the steps of preparing a stream containing propane as the only significant component having a plurality of carbon atoms per molecule, directing said stream over a bed of catalyst particles prepared by the hereinafter defined method to form an effluent stream containing hydrogen and propene at a temperature within the range from about 570° to about 680° C. at a pressure from about 10 to about 1,000 mm mercury, at a space rate of from about 0.2 to about 5 volumes of liquid propane per volume of catalyst per hour and separating propene from said effluent stream, said catalyst having been prepared by:

calcining alumina to provide a calcined alumina powder;

preparing a precursor mixture of said calcined alumina and uncalcined technical boehmite powder providing anhydrous alumina constituting from about 1.01 to about 1.5 times as much alumina as that derived from said calcined alumina powder, said technical boehmite powder having been prepared as a hydrolytic by-product from utilizing triethyl aluminum as a reactant, said technical boehmite having an ignition loss of about 25 percent, said precursor mixture also containing at least one chromium compound providing in the final catalyst from about 0.15 to about 0.4 part of chromia per part of alumina, said mixture also containing water, said mixture containing no other component providing more than about 1 percent of the final catalyst;

forming said mixture into discrete granular particles by pressure-shaping procedures;

calcining the discrete particles at a temperature above 480° C. and below 810° C. to provide chromia-alumina catalyst particles;

cooling the calcined catalyst particles; and thereafter heating the catalyst particles to a temperature near that of said effluent stream to provide said bed of catalyst particles.

2. The process of claim 1: in which the calcined alumina is selected from the group consisting of alpha alumina and mildly calcined technical boehmite; in which the chromium compound is selected from the group consisting of ammonium dichromate, chromic acid, sodium chromate, chromium trioxide, and mixtures thereof; in which the surface area of the catalyst is from about 69 to about 90 square meters per gram; and in which the bulk density of the catalyst is from about 820 to about 1,010 grams per liter.

3. The method of claim 2 in which technical boehmite is mildly calcined for at least 15 minutes at about 400° to about 500° C. to provide the calcined alumina powder.

4. The method of claim 2 in which a mixture of ammonium dichromate and chromic acid provides the chromium compounds and in which the particles are extruded.

* * * * *